(12) United States Patent
Kitamura et al.

(10) Patent No.: US 7,413,526 B2
(45) Date of Patent: Aug. 19, 2008

(54) AUTOMATIC SHIFTING-OPERATION CONTROL SYSTEM

(75) Inventors: Toshio Kitamura, Ageo (JP); Akihisa Hayashi, Ageo (JP); Yuuichi Ichikawa, Ageo (JP); Isao Okamoto, Ageo (JP); Osamu Isobe, Ageo (JP)

(73) Assignee: Nissan Diesel Motor Co., Ltd., Saitama (JP)

( * ) Notice: Subject to any disclaimer, the term of this patent is extended or adjusted under 35 U.S.C. 154(b) by 690 days.

(21) Appl. No.: 10/532,833

(22) Filed: Apr. 26, 2005

(65) Prior Publication Data

US 2008/0070747 A1    Mar. 20, 2008

Related U.S. Application Data

(63) Continuation of application No. PCT/JP03/13653, filed on Oct. 24, 2003.

(30) Foreign Application Priority Data

Oct. 28, 2002    (JP)    ............... 2002-312999
Oct. 28, 2002    (JP)    ............... 2002-313279

(51) Int. Cl.
  *F16H 59/30*    (2006.01)
  *B60K 31/00*    (2006.01)
  *G06F 7/00*    (2006.01)
(52) U.S. Cl. ................ 477/121; 180/170; 701/55
(58) Field of Classification Search ........... 477/115, 477/121, 120, 122, 123; 180/170; 701/54, 701/55, 56
See application file for complete search history.

(56) References Cited

U.S. PATENT DOCUMENTS

| 4,913,006 | A | | 4/1990 | Tsuyama et al. | |
| 5,022,375 | A | * | 6/1991 | Goto et al. | 123/564 |
| 5,679,097 | A | * | 10/1997 | Ohtsuka | 477/121 |
| 6,017,290 | A | | 1/2000 | Kinoshita et al. | |
| 6,428,448 | B2 | * | 8/2002 | Saito et al. | 477/111 |
| 6,482,122 | B2 | * | 11/2002 | Ochiai et al. | 477/42 |
| 2001/0056009 | A1 | | 12/2001 | Ochiai et al. | |

FOREIGN PATENT DOCUMENTS

| JP | 61-074705 | 4/1986 | |
| JP | 63-293438 | 11/1988 | |
| JP | 405087215 A | * 4/1993 | 477/121 |
| JP | 9806 | 11/1998 | |

* cited by examiner

*Primary Examiner*—Roger Pang
(74) *Attorney, Agent, or Firm*—Baker Hostetler LLP

(57) ABSTRACT

An automatic shifting-operation control system having an engine control unit that controls the operation of an engine by a signal of an intake air amount detected by intake air amount detecting unit which detects an intake air amount of an engine, and which includes one or both of a vehicle speed limiting function for reducing a fuel injection amount to suppress a driving speed of a vehicle to a speed equal to or less than a predetermined limited value, and a cruise control function for setting the driving speed of the vehicle to an optional constant speed capable of allowing an automatic cruise of the vehicle, and a transmission control unit configured to control a transmission in accordance with a driving state of the vehicle. The transmission can be automatically controlled in the like manner as that of the normal driving state even when the vehicle is driving with a reduced fuel injection amount by the vehicle speed limiting function or even during the automatic cruise due to the cruise control function of the engine control unit.

9 Claims, 6 Drawing Sheets

AUTOMATIC SHIFTING-OPERATION CONTROL SYSTEM

This application is a continuation of PCT/JP2003/013653, filed on Oct. 24, 2003.

BACKGROUND OF THE INVENTION

1. Field of the Invention

The present invention relates to an automatic shifting-operation control system which automatically controls a transmission of a vehicle in accordance with a driving state detected during a driving of a vehicle. More particularly, the invention relates to an automatic shifting-operation control system capable of automatically controlling a transmission of a vehicle in the like manner as normal driving state even when the vehicle drives with a reduced amount of fuel injection by means of a vehicle speed limiting function or even during automatic cruising by employing a cruise function.

2. Description of the Related Art

Conventionally, a shifting point of transmission control of an automatic or a semi-automatic shifting-operation control system is determined by a map of shifting based on an accelerator opening amount and an engine rotating number. This is because that the accelerator opening amount is suited for detecting driver's intension of acceleration and deceleration during vehicle driving, and that a load applied to the vehicle can be estimated by checking both the steady accelerator opening amount state and the engine rotating number. Such a technique is described on page 30 of the publication entitled "State-of-Art technologies of power transmissions in '98" distributed in No. 9806 JSAE SYMPOSIUM held on Nov. 13, 1998 by the Society of Automotive Engineers of Japan.

To meet the speedup of vehicles accompanied by, for example, development of expressways, the output of a vehicle's engine has been increased and the number of stages of gear of a transmission has been increased. On the other hand, it is also required to reduce the driving cost by improving consumption of fuel. Hence, to improve the fuel consumption, it might be conceived to suppress the maximum engine rotating number. For example, to suppress the vehicle speed to a predetermined limited value, there is a technique in which a normal fuel supply amount obtained from the accelerator opening amount and the engine rotating number, and fuel supply amount determined by the vehicle speed to limit a vehicle speed are compared with each other, and smaller one of the fuel supply amount is chosen, so that the fuel supply amount to the engine is reduced so as to limit the maximum engine rotating number. This technique is described in, for example, Japanese Unexamined (Kokai) Patent Publication No. 10-252520.

Nevertheless, in a vehicle having such a conventional automatic or semi-automatic shifting-operation control system and engine control means including a vehicle speed limiting function which reduces the fuel injection amount for suppressing the driving speed of the vehicle to less than or equal to the predetermined control value, during the operation of the vehicle speed limiting function of the engine control means, the fuel injection amount is limited by the control operation done by the engine side. Thus, a desired engine rotating condition in compliance with a depression amount of the accelerator pedal by a driver cannot be acquired. For this reason, when the vehicle is accelerated with a lower gear stage, the engine rotating number does not reach a predetermined up-shifting engine rotating number in accordance with the accelerator opening amount, and if the driver continues depressing of the accelerator pedal, the gear is reluctantly held at an intermediate gear stage and cannot be sufficiently shifted up in some cases. Further, the vehicle is not accelerated although the accelerator pedal is depressed, and this state might be erroneously identified as being at a high load state such as during hill climbing.

From the reasons described above, it becomes necessary to newly incorporate an automatic shift determination controller which can work to estimate a load based on the fuel injection amount and the engine rotating number that can be indication of substitutive characteristics and in addition, to produce a shifting map based on such a conception that is quite different from the conventional shifting map. Thus, past experience can not be used for extracting therefrom parameters usable for adjusting a driving performance of a vehicle and accordingly, efficiency in the controlling operation is often deteriorated.

In a vehicle having the conventional automatic or semi-automatic shifting-operation control system and engine control means having a cruise control function capable of achieving an automatic cruise by setting a driving speed of the vehicle to an optional constant speed, during cruising-controlling operation for the automatic cruise is being carried out, the vehicle drives in a state such that a driver releases his or her foot from the accelerator pedal, the load of the vehicle cannot be estimated from the accelerator opening amount. From these reasons, it becomes necessary to newly incorporate an automatic shifting-operation determination controller which estimates a load from the fuel injection amount and the engine rotating number that can be indication of substitutive characteristics, and to produce a shifting map based on such a conception that is quite different from the conventional shifting map. Thus, for example, past experience cannot be used for extracting therefrom parameters usable for adjusting a driving performance of a vehicle and accordingly, efficiency in the controlling operation is often deteriorated.

SUMMARY OF THE INVENTION

Therefore, for solving the above-mentioned problems, the present invention makes it an object to provide an automatic shifting-operation control system, which is capable of automatically controlling a transmission in a manner similar to the normal driving state of a vehicle even when the vehicle drives with a reduced fuel injection amount by means of a vehicle speed limiting function or even while the vehicle is in automatic cruising operation by employing a cruise control function.

In order to attain the above object, an automatic shifting-operation control system according to a first aspect of the present invention includes an intake air amount detecting means configured to detect an amount of intake air of an engine; an engine control means configured to control an operation of the engine based on a signal indicative of a detected intake air amount, and to include one or both of a vehicle speed limiting function reducing a fuel injection amount so that a driving speed of a vehicle is suppressed to a speed equal to or less than a predetermined limited value and a cruise control function setting the driving speed of the vehicle to an optional constant speed allowing the vehicle to do automatic cruise; and, a transmission control means configured to control a transmission in accordance with a driving state of the vehicle. The automatic shifting-operation control system further includes a means for determining whether a vehicle speed is being limited by the above-mentioned vehicle speed limiting function, and the transmission is controlled such that when it is determined that the vehicle speed is being limited, reference to the detected intake air amount is interrupted while also interrupting reference to a shifting map based on that intake air amount and an engine rotating number, and reference is made to a pseudo intake air amount calculated from a fuel injection amount controlled so as to suppress the driving speed of the vehicle to a speed equal to or less than a predetermined limited value and to the engine rotating number, and further reference is made to a specified shifting map based on the pseudo intake air amount and the engine rotating number.

With this constitution, the said means for determining that the vehicle speed is being limited determines whether or not the engine control means is implementing limiting of the vehicle speed by the vehicle speed limiting function thereof, and the transmission is controlled such that when it is determined that the vehicle speed is being limited, reference to the detected intake air amount is interrupted while interrupting reference to the shifting map based on the intake air amount and the engine rotating number, and instead, reference is made to the pseudo intake air amount calculated from the fuel injection amount controlled such that the driving speed of the vehicle is suppressed to less than or equal to the predetermined limited value and the engine rotating number, and to the specified shifting map based on the pseudo intake air amount and the engine rotating number. To this effect, even if the fuel injection amount is reduced by the vehicle speed limiting function and the engine rotating state is not in compliance with the depression amount of the accelerator pedal by the driver, the transmission can be automatically controlled in a manner similar to the normal driving state of the vehicle. Therefore, production of a shifting map based on a conception that is quite different from the conventional shifting map is not needed, and further, past experience can be used for extracting therefrom parameters for adjusting the driving performance of the vehicle, and deterioration of efficiency in the controlling operation can be prevented.

An automatic shifting-operation control system according to a second aspect of the present invention includes: an intake air amount detecting means configured to detect an intake air amount of an engine, an engine control means configured to control an operation of the engine by a signal indicative of the detected intake air amount, and to include one or both of a vehicle speed limiting function for reducing a fuel injection amount so that a driving speed of a vehicle is suppressed to a speed equal to or less than a predetermined limited value, and a cruise control function for setting the driving speed of the vehicle to an optional constant speed to thereby allow automatic cruise of the vehicle, and a transmission control means configured to control a transmission in accordance with a driving state of the vehicle. The automatic shifting-operation control system further includes a means for determining whether or not the above-mentioned cruise control function is carrying out the cruise control, and the transmission is controlled such that when it is determined that the cruise control is being in operation, reference to the detected intake air amount is interrupted while interrupting reference to a shifting map based on the intake air amount and the engine rotating number, and instead, reference is made to a pseudo intake air amount calculated from a fuel injection amount maintaining the above-mentioned optional constant speed during the cruise control and the engine rotating number, and also reference is made to a specified shifting map based on the pseudo intake air amount and the engine rotating number.

With this constitution, the said means for determining that the cruise control is in operation determines whether or not the cruise control function is carrying out the cruise control, the transmission is controlled such that when it is determined that the cruise control is being in operation, reference to the detected intake air amount is interrupted while interrupting reference to a shifting map based on the intake air amount and the engine rotating number, and reference is instead made to a pseudo intake air amount calculated from a fuel injection amount maintaining the constant speed during the cruise control and the engine rotating number, and also reference is made to a specified shifting map based on the pseudo intake air amount and the engine rotating number. Hence, even when reference cannot be made to the accelerator depression amount by a driver during the automatic cruise of the vehicle due to the cruise control function of the engine controlling means, the transmission can be automatically controlled in a manner similar to the normal driving state of the vehicle. Therefore, production of a shifting map based on a conception that is quite different from the conventional shifting map is needed. Thus, past experience can be used for extracting therefrom parameters for adjusting the driving performance of the vehicle, and deterioration of efficiency in the controlling operation can be prevented.

An automatic shifting-operation control system according to a third aspect of the present invention includes an intake air amount detecting means configured to detect an intake air amount of an engine, an engine control means configured to control the operation of the engine by a signal indicative of a detected intake air amount, and to include one or both of a vehicle speed limiting function for reducing a fuel injection amount so that a driving speed of a vehicle is suppressed to a speed equal to or less than a predetermined limited value and a cruise control function for setting the driving speed of the vehicle to an optional constant speed to allow automatic cruise of the vehicle, and a transmission control means configured to control a transmission in accordance with a driving state of the vehicle. The automatic shifting-operation control system further includes a means for determining whether or not the vehicle speed limiting function limits the vehicle speed, and the transmission is controlled such that when it is determined that limiting of the vehicle speed is being carried out by the vehicle speed limiting function, reference to the detected intake air amount is interrupted while interrupting reference to a shifting map based on the intake air amount and the engine rotating number, and reference is instead made to a pseudo intake air amount calculated from a fuel injection amount controlled such that a driving speed of the vehicle is suppressed to a speed equal to or less than a predetermined limited value and to the engine rotating number, and also reference is made to a specified shifting map based on the pseudo intake air amount and the engine rotating number. The automatic shifting-operation control system further includes a further means for determining whether or not the cruise control function is carrying out the cruise control of the vehicle, and the transmission is controlled such that when it is determined that the cruise control function is carrying out the cruise control, reference to the detected intake air amount is interrupted while interrupting reference to a shifting map based on the intake air amount and the engine rotating number, and reference is instead made to a pseudo intake air amount calculated from a fuel injection amount maintaining the constant speed during the cruise control and the engine rotating number, and to a specified shifting map based on the pseudo intake air amount and the engine rotating number.

With this constitution, the first-mentioned means for determining that the vehicle speed is being limited determines whether or not the vehicle speed is being limited by the vehicle speed limiting function, and the transmission is controlled such that when it is determined that the vehicle speed is being limited, reference to the detected intake air amount is interrupted while interrupting reference to the shifting map based on the intake air amount and the engine rotating number, reference is instead made to the pseudo intake air amount calculated from the fuel injection amount controlled such that a running speed of the vehicle is suppressed to the speed equal to or less than the predetermined limited value and to the engine rotating number, and further reference is made to the specified shifting map based on the pseudo intake air amount and the engine rotating number. The second means for determining that the cruise control is being carried out determines whether or not the cruise control is being carried out by the cruise control function, and the transmission is controlled such that when it is determined that the cruise control is being carried out, reference to the detected intake air amount is interrupted while interrupting reference to a shifting map based on the intake air amount and the engine rotating number, and reference is instead made to a pseudo intake air amount calculated from a fuel injection amount maintaining the constant speed during the cruise control of the vehicle and to the engine rotating number, and also reference is made to a specified shifting map based on the pseudo intake air amount and the engine rotating number. To this end, even when the fuel injection amount is reduced by the vehicle speed limiting function and the engine rotating state is not in compliance with the depression amount of the accelerator pedal by the driver, the transmission can be automatically controlled in a manner similar to the normal driving state. Further, even when reference to the accelerator depression amount by the driver cannot be made during the automatic cruise of the vehicle by the cruise control function, the transmission can be automatically controlled in a manner similar to the normal driving state. Therefore, production of a shifting map based on a conception that is quite different from the conventional shifting map is needed. Hence, past experience can be used for extracting therefrom parameters adjusting the driving performance of the vehicle, and deterioration of efficiency in the controlling operation can be prevented.

The intake air amount detecting means may be configured to detect the accelerator opening amount of the engine.

The intake air amount detecting means may also be configured to detect an intake pressure of an air-intake system of the engine.

DESCRIPTION OF THE PREFERRED EMBODIMENTS

A detailed description of an embodiment of the present invention will be provided hereinbelow with reference to the accompanying drawings.

Figure 1:
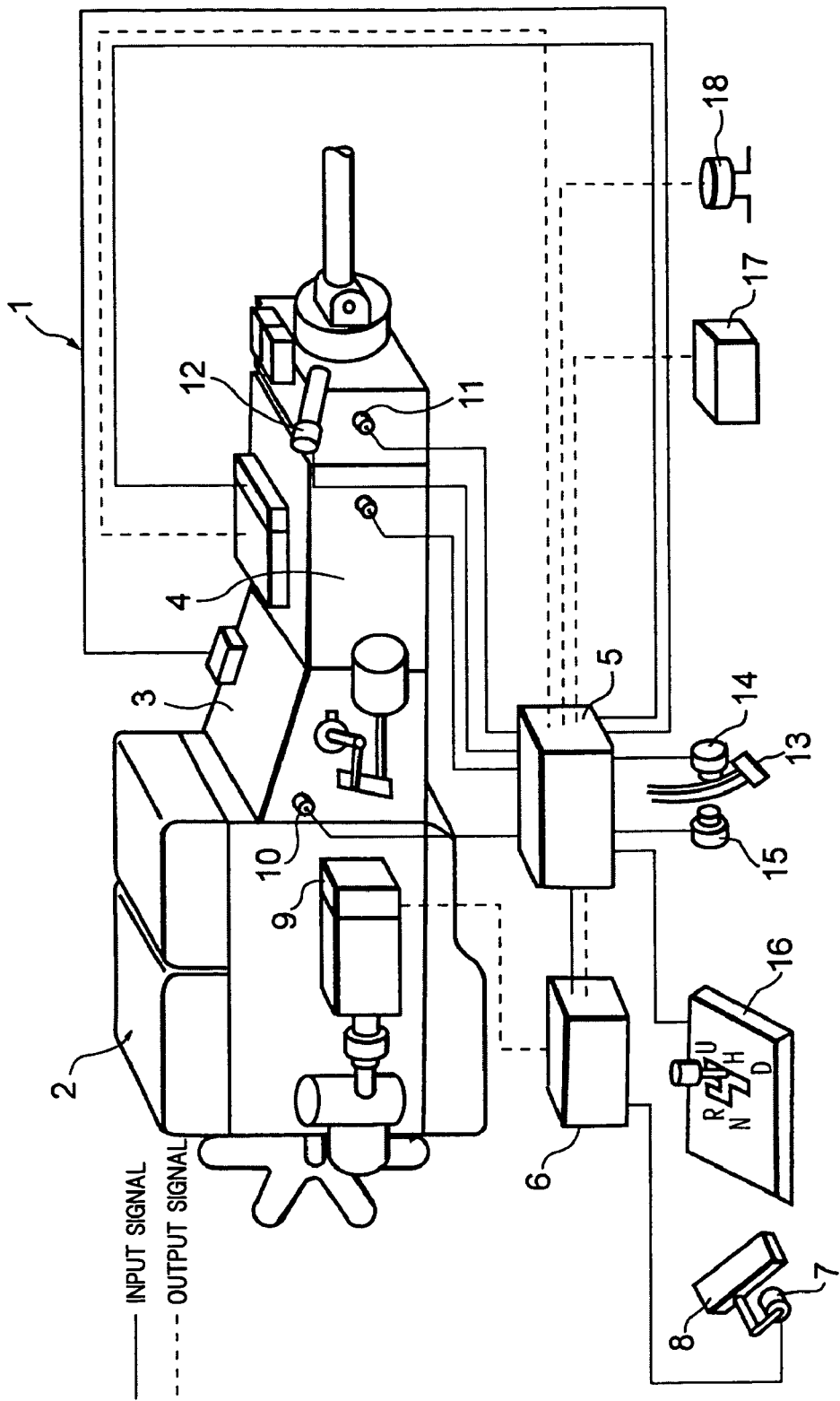
FIG. 1 is a perspective and explanatory view illustrating the entire constitution of an automatic shifting-operation control system, which includes an engine according to an embodiment of the present invention.

FIG. 1 is a perspective and explanatory view, which illustrates an automatic shifting-operation control system as the entire constitution including an engine, according to a preferred embodiment of the present invention.

This automatic shifting-operation control system 1 automatically controls a transmission of a vehicle such as a truck, a bus and a passenger car in accordance with a driving state detected during driving of the vehicle. In FIG. 1, a transmission 4 is mounted on an engine 2 through a clutch 3. A transmission control unit 5 is connected to the transmission 4 through an electric wiring. An engine control unit 6 is connected to the engine 2 through an electric wiring, and an accelerator pedal 8 is connected to the engine control unit 6 through an accelerator opening sensor 7.

The accelerator opening sensor 7 detects the opening amount (a degree of opening) of the accelerator which is opened and closed by the operation of an accelerator pedal 8, carried out by a driver. The accelerator opening sensor 7 corresponds to an intake air amount detecting means. The intake air amount detecting means is not limited to the accelerator opening sensor 7, and any means can be used only if it detects an amount which is proportional to the intake air amount of the engine 2. For example, means which detect an intake pressure of an air-intake system of the engine.

The engine control unit 6 is connected to the accelerator opening sensor 7 through an electric wire. This engine control unit 6 is engine control means which inputs a signal of the accelerator opening amount detected by the accelerator opening sensor 7 and controls the operation of the engine 2. In the present embodiment of the invention, the engine control unit 6 includes one or both of a vehicle speed limiting function for reducing a fuel injection amount so that the driving speed of the vehicle is suppressed to a value equal to or less than a predetermined limited value, and a cruise control function for setting the driving speed of the vehicle to an optional constant speed to allow the vehicle to do the automatic cruise. An output signal issued by the engine control unit 6 is transmitted to a fuel injection unit 9 mounted on the engine 2. Either a signal indicating that the vehicle speed limiting function is being operated, or an output signal indicating that the cruise control function is implementing the cruise control, and a signal indicative of an actual accelerator opening amount, which will be hereinafter referred to as an actual accelerator opening amount signal, and is detected by the accelerator opening sensor 7 are transmitted to the transmission control unit 5.

The transmission control unit 5 is connected to the transmission 4 through an electric wiring. The transmission control unit 5 functions as transmission control means which controls the transmission 4 in accordance with the driving state of the vehicle. More specifically, the transmission control unit 5 controls the transmission 4 by receiving signals from an engine rotating speed sensor 10, a gear rotating speed sensor 11 and a vehicle speed sensor 12, which are mounted on the transmission 4, and also by receiving signals from a clutch-engaging switch 14 and a clutch-disengaging switch 15, both being mounted on a clutch pedal 13. A shift tower 16, which is provided with a shift lever for shifting gears of the transmission 4, is connected to the transmission control unit 5.

A signal indicative of control contents from the transmission control unit 5 (it will be referred to as a control contents-signal) is transmitted to the engine control unit 6. The control contents-signal is further transmitted to a display monitor 17 and a buzzer 18, so that a driver is informed of the same.

In accordance with the present invention, the transmission control unit 5 includes a vehicle-speed-limit determining means therein. Thus, the vehicle-speed-limit determining means functions to determine whether or not the vehicle speed is being limited by the vehicle speed limiting function based on a signal from the engine control unit 6, which indicates that the vehicle speed is being limited. If it is determined that the vehicle speed is being limited, the reference to an actual accelerator opening amount that was transmitted from the engine control unit 6 based on the detection by the accelerator opening sensor 7 is interrupted, and further reference to the shifting map for an actual accelerator opening amount based on that transmitted actual accelerator opening amount and the engine rotating number is interrupted, and reference is instead made to a pseudo accelerator opening amount calculated from the fuel injection amount controlled so as to suppress the driving speed of the vehicle to a speed equal to or less than the predetermined limited value and to the engine rotating number, and reference is made to the shifting map for the pseudo accelerator opening amount based on the pseudo accelerator opening amount and the engine rotating number, thereby controlling the transmission 4.

Further, cruise control determining means is provided for determining whether or not the cruise control is being carried out by the cruise control function on the basis of a signal indicating that the cruise control is being carried out by the engine control unit 6. If it is determined that cruise control is being carried out, the reference to the actual accelerator opening amount transmitted from the engine control unit 6 based on the accelerator opening sensor 7 is interrupted while interrupting reference to the shifting map for the actual accelerator opening amount based on the actual accelerator opening amount and the engine rotating number, and reference is instead made to the pseudo accelerator opening amount calculated from the fuel injection amount to maintain an optional constant speed of a vehicle during the cruise control and the engine rotating number while making reference to the shifting map for the pseudo accelerator opening amount based on the pseudo accelerator opening amount and the engine rotating number, to thereby control the transmission 4.

With this constitution, even if the vehicle runs in a state in which the fuel injection amount is reduced by the vehicle speed limiting function and if a normal state of an engine of which the rotating number varies in compliance with a depression amount of the accelerator pedal by a driver can not be obtained, the transmission 4 can be automatically controlled in like manner as that of the normal driving. Even when reference cannot be made to the depression amount of the accelerator pedal 8 depressed by the driver during the automatic cruise of the vehicle due to the cruise control function, the transmission 4 can be automatically controlled in like manner as that of the normal driving of the vehicle.

At the present stage, an explanation of the operation of the automatic shifting-operation control system having the above-described constitution will be provided hereinbelow with reference to FIGS. 2 to 5.

Figure 2:
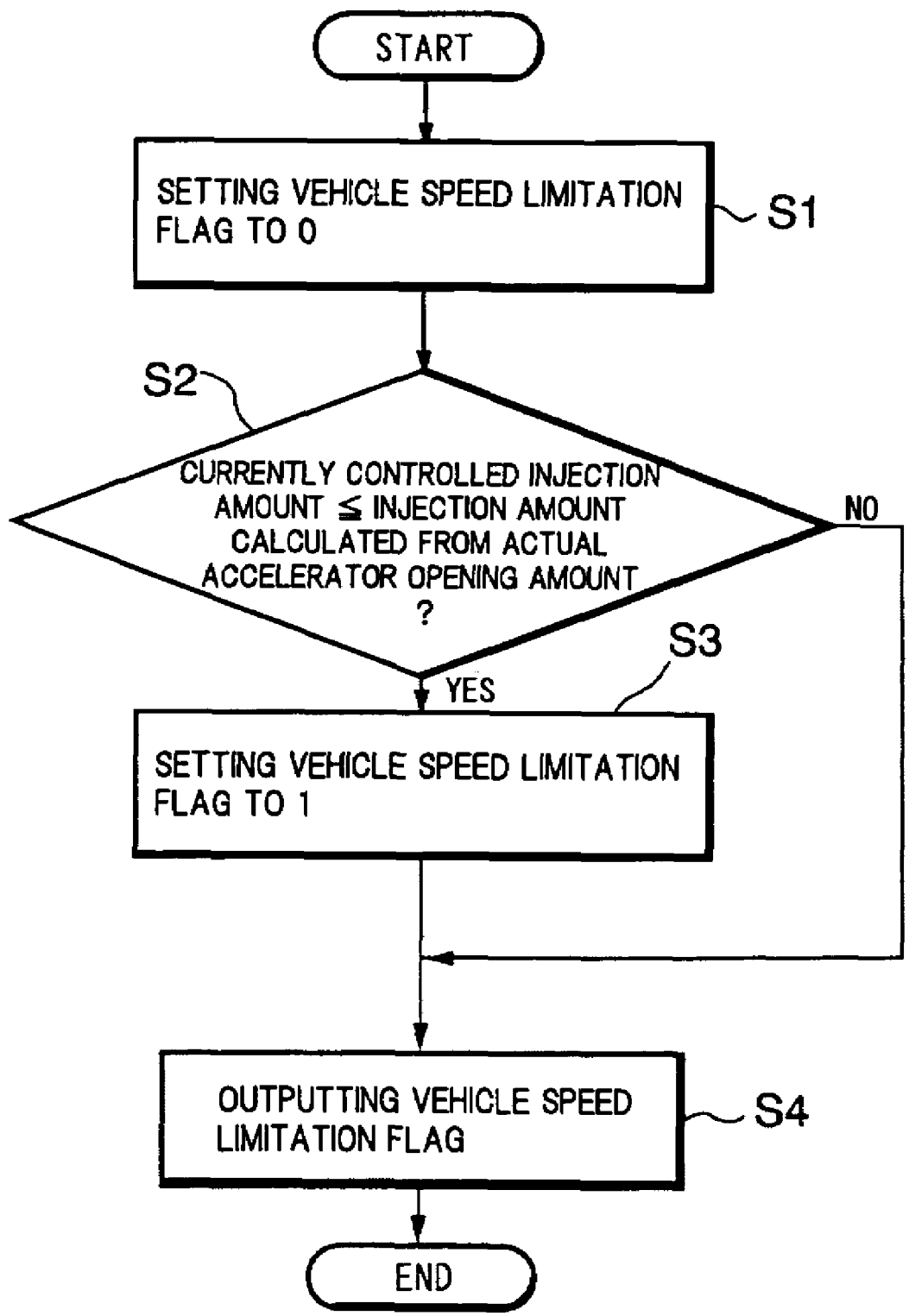
FIG. 2 is a flowchart illustrating a control operation to control the engine, carried out by a vehicle speed limiting function of an engine control unit as illustrated in FIG. 1.

FIG. 2 is a flowchart, which illustrates a control operation provided to the engine 2 by the vehicle speed limiting function of the engine control unit 6 as shown in FIG. 1.

First, a flag of vehicle under speed limitation, i.e., a vehicle speed limitation flag is initially set "0" (flag=0) with reference to a speed limiting state of a vehicle conducted by the vehicle speed limiting function (step S1).

Next, with reference to the fuel injection amount in the engine 2, it is determined whether or not the current controlled injection amount is equal to or smaller than an injection amount calculated from the actual accelerator opening amount detected by the accelerator opening sensor 7 due to the operation of the accelerator pedal 8 performed by the driver (step S2).

Figure 6:
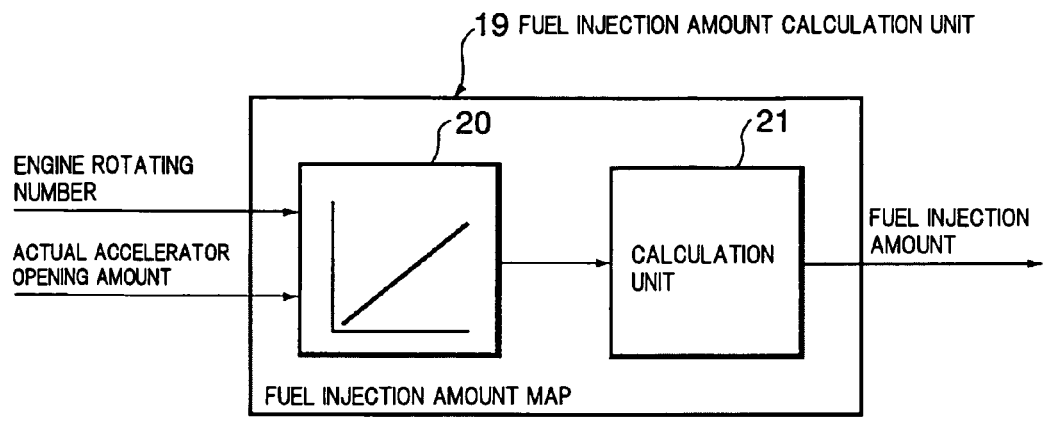
FIG. 6 is a block diagram illustrating an internal structure of a fuel injection amount calculation unit, which implements calculation of a fuel injection amount of the engine; and, FIG. 7 is a block diagram illustrating an internal structure of a pseudo accelerator opening calculation unit, which implements calculation of a pseudo accelerator opening amount.

Here, the calculation of the fuel injection amount in the engine 2 is carried out by a fuel injection amount calculation unit 19 shown in FIG. 6. Namely, a signal indicative of the engine rotating number issuing from the engine rotating speed sensor 10 and a signal indicative of the actual accelerator opening amount issuing from the accelerator opening sensor 7 are taken in the fuel injection amount calculation unit 19, and these signals are applied to a fuel injection amount map 20 which is preliminarily produced using the engine rotating number and the actual accelerator opening amount as variable components, and the relation between these components are calculated by a calculation unit 21 to calculate the fuel injection amount. This calculation result is constantly output toward outside the calculation unit 21.

Using the value of the fuel injection amount obtained by the above calculation, if it is determined that the currently controlled injection amount is greater than the injection amount calculated from the actual accelerator opening amount, it is understood that the control for recovering the vehicle speed is being carried out, and the operation proceeds to "NO" to go to step S4. Then, the vehicle speed limitation flag=0, which was set by the aforementioned step S1 is output straight away in step S4.

If it is determined in step S2 that the currently controlled injection amount is equal to or smaller than the injection amount calculated from the actual accelerator opening amount, it is understood that the controlled injection amount is in a condition of reduced amount of injection, and the operation proceeds to "YES" and to step S3. Then, a flag of vehicle under speed limitation, i.e., the vehicle speed limitation flag is set "1" (flag=1) with reference to a speed limiting state of a vehicle conducted by the vehicle speed limiting function. Then, the operation proceeds to step S4, where the vehicle speed limitation flag=1, which was set in step S3 is output.

Figure 3:
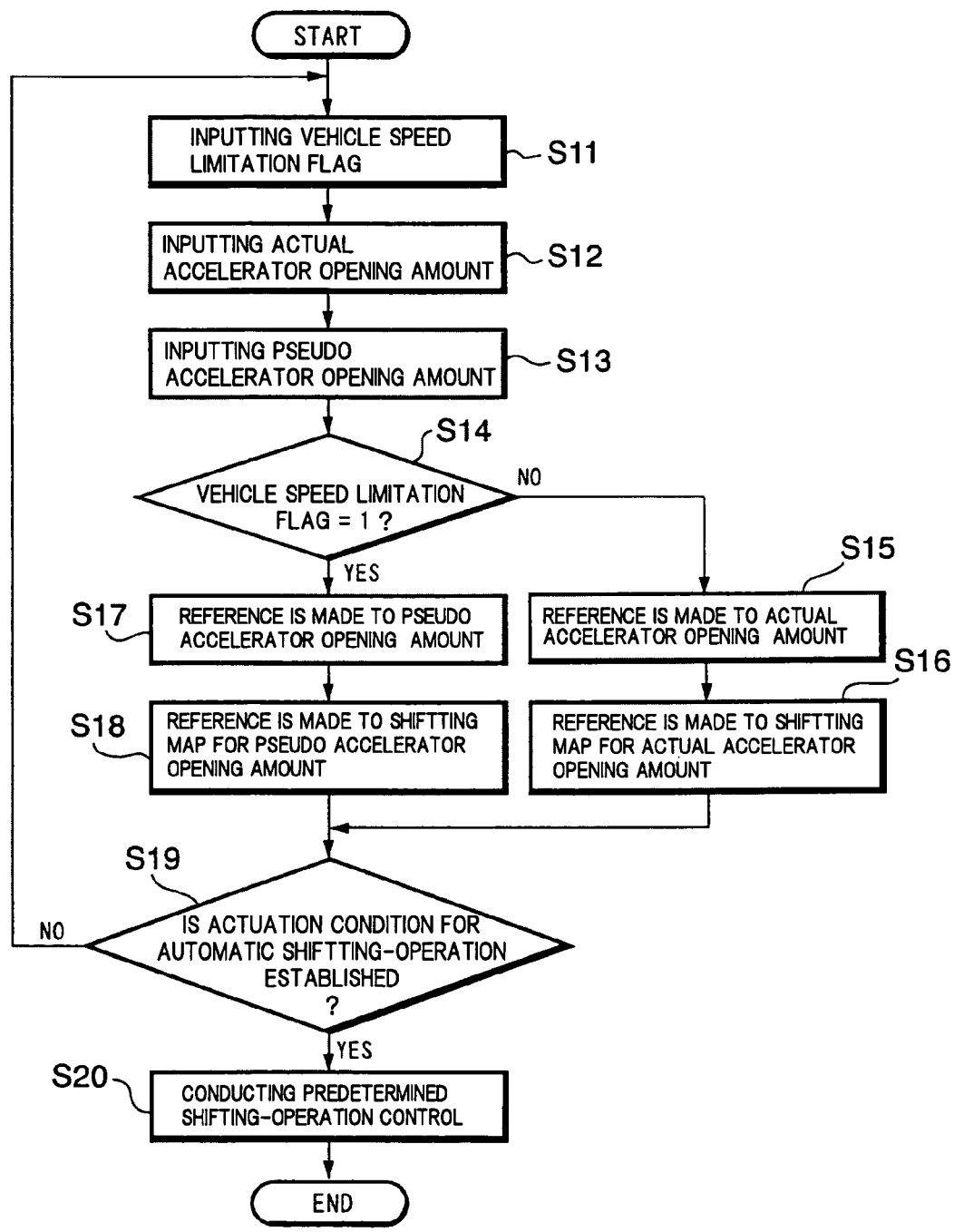
FIG. 3 is a flowchart illustrating a control operation to control a transmission, carried out by a transmission control unit as shown in FIG. 1, at the time when the control operation to control the engine is carried out by the above-mentioned vehicle speed limiting function.

Next, FIG. 3 is a flowchart, which illustrates a control operation to control the transmission 4, which is carried out by a transmission control unit 5 shown in FIG. 1 at the time when the control operation provided to the engine by the aforementioned vehicle speed limiting function.

First, input of the vehicle speed limitation flag that is output by the above-mentioned step S4 shown in FIG. 2 is carried out (step S11). Then, input of the actual accelerator opening amount is executed (step S12) in order to input and read from the engine control unit 6 a signal indicative of the actual accelerator opening amount detected by the accelerator opening sensor 7.

The pseudo accelerator opening amount is input (step S13). Data of the pseudo accelerator opening amount, which is preliminarily calculated and obtained is stored in a memory or the like. The step 13 is for reading this data from the memory or the like.

Figure 7:
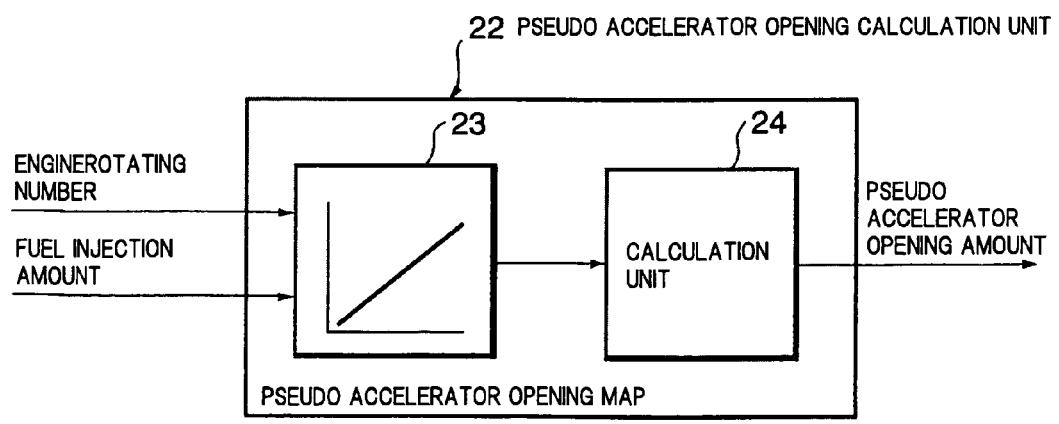

The calculation of the pseudo accelerator opening amount is executed by a pseudo accelerator opening calculation unit 22 as shown in FIG. 7. That is, a signal indicating the engine rotating number and issuing from the engine rotating speed sensor 10 shown in FIG. 1, and a signal indicating the fuel injection amount that is controlled so as to suppress the driving speed of the vehicle to a speed equal to or less than the predetermined limited value if the vehicle speed limiting function is being in operation are taken into the pseudo accelerator opening calculation unit 22, and these signals are applied to a pseudo accelerator opening map 23, which is preliminarily produced using the engine rotating number and the fuel injection amount as variable components, and the relation thereof is calculated by a calculation unit 24 to calculate the pseudo accelerator opening amount. This calculation result is constantly output toward outside from the calculation unit 24.

Subsequently, it is determined whether the vehicle speed limitation flag is "1" (step S14). Namely, it is determined that the vehicle speed is being limited by the vehicle speed limiting function. When the vehicle speed limitation flag is not "1" (vehicle speed is not being limited), the operation proceeds to "NO" and to step S15 where reference is made to the actual accelerator opening amount detected by the accelerator opening sensor 7 and thereafter, further reference is made to the preliminarily produced shifting map for the actual accelerator opening amount (step S16). Then, the operation proceeds to step S19 described later.

On the other hand, if the vehicle speed limitation flag is 1 in step S14 (vehicle speed is being limited), the operation proceeds to "YES" and to step S17 where reference is made to the pseudo accelerator opening amount obtained by the pseudo accelerator opening calculation unit 22 as shown in FIG. 7 and then, reference is made to the shifting map for the pseudo accelerator opening amount produced using the pseudo accelerator opening amount (step S18). Then, the operation proceeds to step S19.

It should be understood that the step S14 corresponds to the vehicle speed-limit-determining means that works to determine whether or not the vehicle speed is being limited by the vehicle speed limiting function.

When it is determined that the vehicle speed is not being limited ("NO" in step S14), switching is conducted so that reference is made to the detected actual accelerator opening amount and to the shifting map for the actual accelerator opening amount on the basis of such actual accelerator opening amount and the engine rotating number, but when it is determined that the vehicle speed is being limited ("YES" in step S14), switching is conducted so that reference is made to the pseudo accelerator opening amount that is calculated from the fuel injection amount controlled to suppress the driving speed of the vehicle to a speed equal to or less than the predetermined limited value and the engine rotating number, and to the shifting map for the pseudo accelerator opening amount on the basis of the pseudo accelerator opening amount and the engine rotating number.

Thereafter, it is determined whether or not an actuation condition for starting an automatic shifting-operation is established in accordance with either the actual accelerator opening amount and the shifting map for the actual accelerator opening amount, or the pseudo accelerator opening amount and the shifting map for the pseudo accelerator opening amount in step S19.

If the actuation condition of automatic shifting-operation has not yet been established, the operation proceeds to "NO" and returns to step S11 to repeat the operations of steps S11 through S18.

If the actuation condition for starting an automatic shifting-operation is established, the operation proceeds to "YES" and to step S20, to thereby conduct a predetermined speed-changing control operation due to the normal automatic shifting-operation control, and the operation is completed (END).

With such operation, even when the vehicle runs in a state in which the fuel injection amount is reduced by the vehicle speed limiting function and a normal state of an engine of which the rotating number varies in compliance with the depression amount of the accelerator pedal by the driver can not be obtained, the transmission 4 can be automatically controlled in like manner as the normal driving state of the vehicle.

Figure 4:
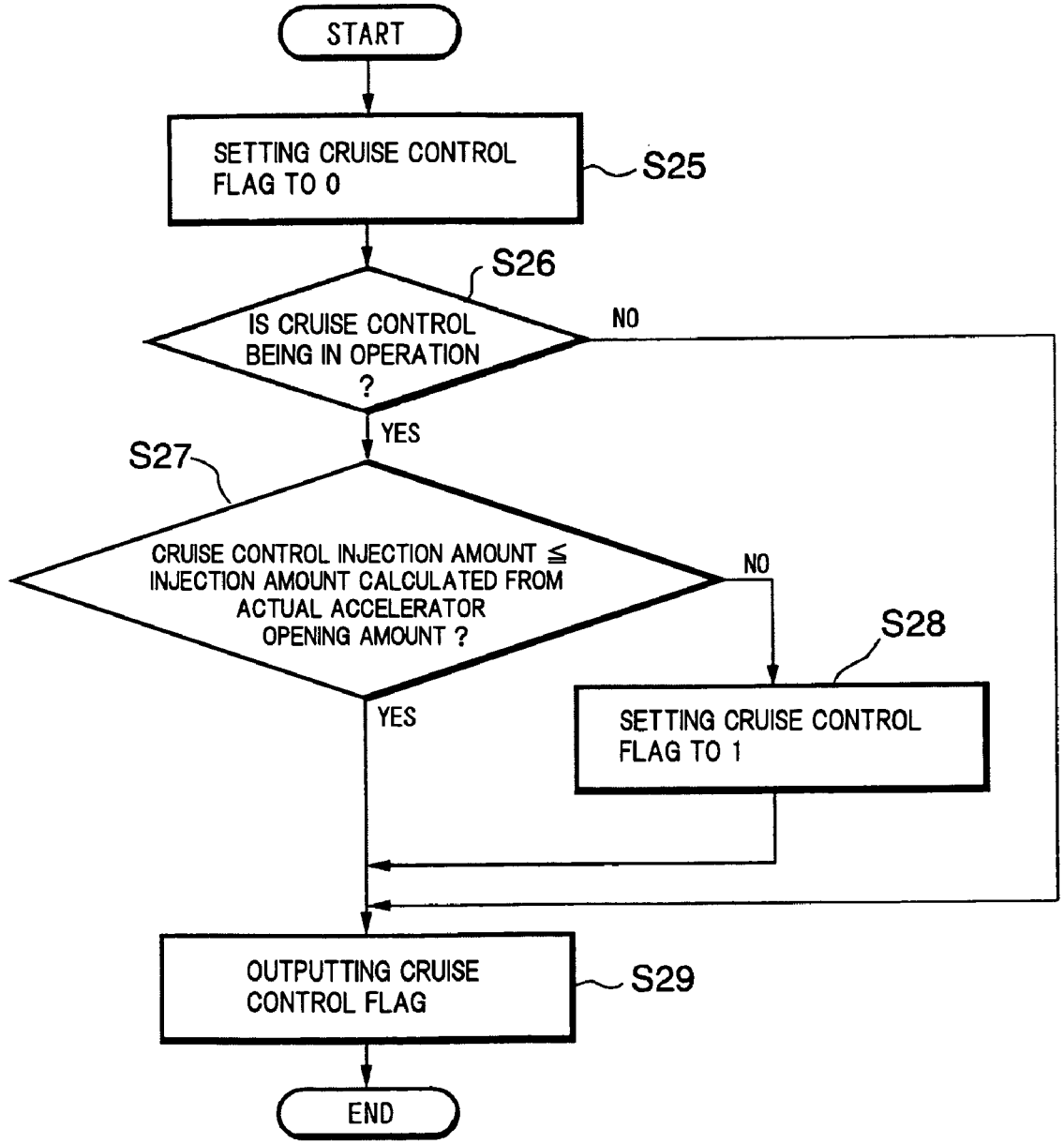
FIG. 4 is a flowchart illustrating a control operation to control the engine, carried out by a cruise control function of the engine control unit as shown in FIG. 1.

Next, FIG. 4 is a flowchart illustrating a control operation of the engine 2 by a cruise control function of the engine control unit 6 as shown in FIG. 1.

First, concerning the cruise control state carried out by the cruise control function, a cruise control flag is initially set to "0" in step S25.

Subsequently, it is determined whether or not cruise control is being in operation (step S26). Namely, it is determined whether or not the automatic cruise of a vehicle is being carried out by the cruise control function. IF the automatic cruise is not being in operation, the control operation proceeds to "NO" and to step S29. Then, the cruise control flag=0 (flag=0) set in step S25 is straightaway output in step S29.

On the other hand, when it is determined that the cruise control is being in operation in step S26, the operation proceeds to "YES" and to step S27. Then, with respect to the fuel injection amount of the engine 2, determination is made as to whether or not the cruise control injection amount for maintaining an optional constant speed during the cruise control is equal to or less than the injection amount calculated from the actual accelerator opening amount detected by the accelerator opening sensor 7 in response to the operation of the accelerator pedal 8 by a driver.

The calculation of the fuel injection amount of the engine 2 is executed by the fuel injection amount calculation unit 19 as shown in FIG. 6 in the similar manner to that described above. Namely, a signal indicative of the engine rotating number issuing from the engine rotating speed sensor 10 as shown in FIG. 1, and a signal indicative of the actual accelerator opening amount issuing from the accelerator opening sensor 7 are taken in the fuel injection amount calculation unit 19, and these signals are applied to a fuel injection amount map 20, which is preliminarily produced using the engine rotating number and the actual accelerator opening amount as variable components, and the relationship among the above-mentioned signals and the fuel injection amount map is processed by the calculation unit 21 to calculate and obtain a corresponding fuel injection amount. This calculation result is constantly output toward outside of the calculation unit 21.

Due to the employment of the value of the fuel injection amount obtained by the above-mentioned calculation, if it is determined that the currently controlled injection amount is greater than the injection amount calculated from the actual accelerator opening amount, it is understood that the control of the automatic cruise is in operation, and the operation proceeds from step S27 to "NO" and to step S28.

Concerning the cruise control state executed by the cruise control function, the cruise control flag is set to "1". Then, the operation proceeds to step S29 where the cruise control flag=1 as set in step S28 is straightaway output.

When it is determined in step S27 that the currently controlled injection amount is equal to or smaller than the injection amount calculated from the actual accelerator opening amount, it is understood that the actual accelerator opening amount due to the operation of the accelerator pedal 8 by a vehicle driver indicates the driver's intention to accelerate beyond the set speed, and the operation proceeds to "YES" and to step S29 where the cruise control flag=0 that was set in step S25 is straightaway output.

Figure 5:
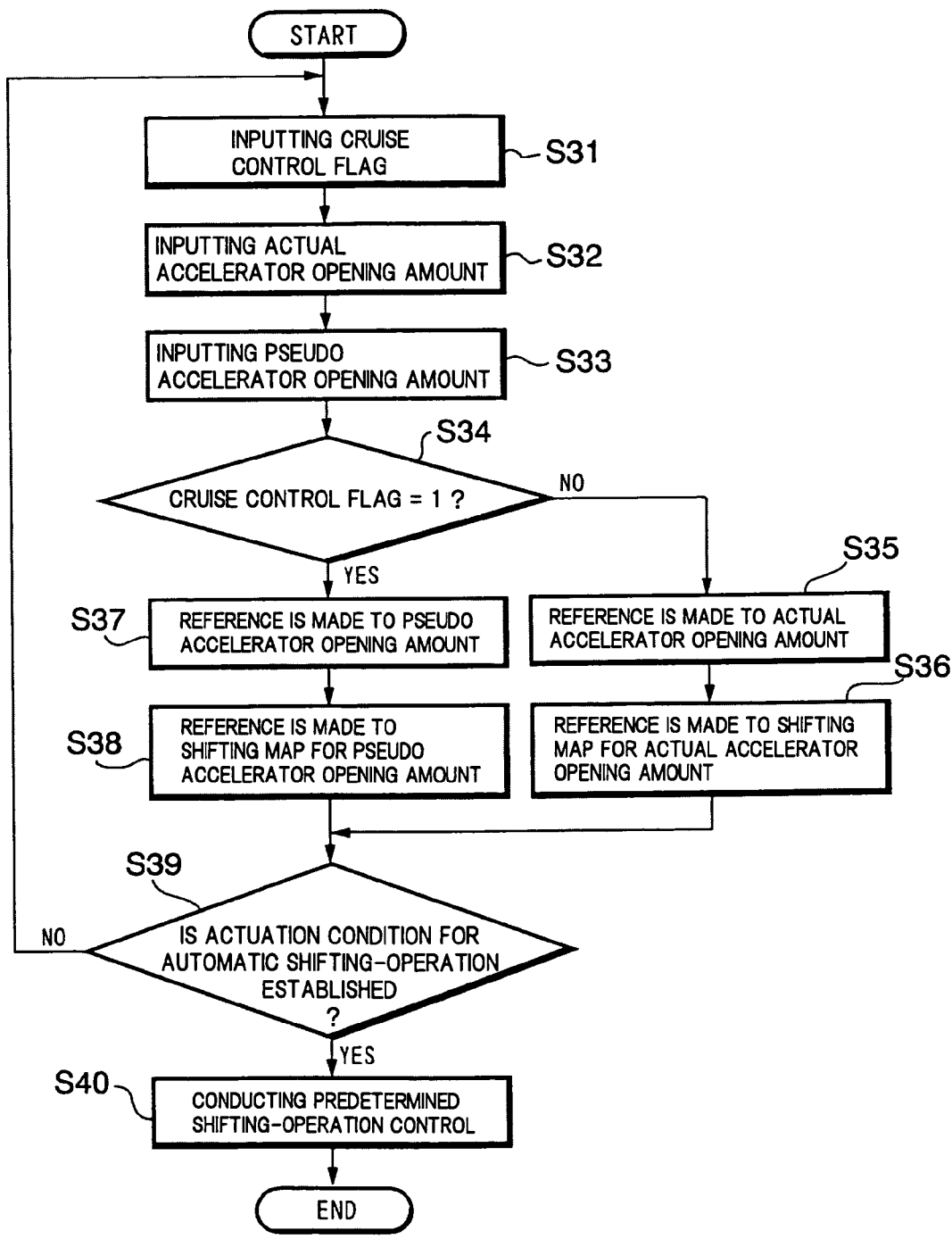
FIG. 5 is a flowchart illustrating a control operation to control a transmission of a vehicle by the transmission control unit as shown in FIG. 1 at the time when the control operation to control the engine is carried out by the cruise control function.

FIG. 5 is a flowchart illustrating a control operation executed by the transmission control unit 5 as shown in FIG. 1 to control the transmission 4 at the time when the control operation for the engine is conducted by the cruise control function of the engine control unit 6.

At the initial stage, the cruise control flag which has been output in step S29 of FIG. 4 is input in step S31. Subsequently, inputting of an actual accelerator opening amount is executed in step S32. This step is conducted in a manner such that a signal indicating an actual accelerator opening amount detected by the accelerator opening sensor 7 as shown in FIG. 1 is input and read from the engine control unit 6.

Further, a pseudo accelerator opening amount is input in step S33 in a manner such that data of the pseudo accelerator opening amount, which is preliminarily calculated and stored in, e.g., a memory or the like is read from the memory or the like.

At this stage, it should be noted that the above-mentioned calculation of the pseudo accelerator opening amount is executed by a pseudo accelerator opening calculation unit 22 as shown in FIG. 7. Namely, a signal indicative of the engine rotating number issued by the engine rotating speed sensor 10 as shown in FIG. 1, and a signal indicative of the fuel injection amount controlled for maintaining an optional constant speed during the cruise control are taken in the pseudo accelerator opening calculation unit 22, so that these two signals are applied to a pseudo accelerator opening amount map 23 which is preliminarily produced using the engine rotating number and the fuel injection amount as variable components, and the relationship between the signals is processed by a calculation unit 24 to calculate the pseudo accelerator opening amount. This calculation result is constantly output toward outside the pseudo accelerator opening calculation unit 22.

Next, it is determined whether or not the cruise control flag is 1 in step S34. Namely, determination as to whether or not the automatic cruise is being in operation due to the cruise control function is conducted. When the cruise control flag is not "1" (automatic cruise is not being in operation), the control operation proceeds to "NO" and to step S35 to make reference to the actual accelerator opening amount detected by the accelerator opening sensor 7, and further reference is made to the preliminarily produced shifting map for the actual accelerator opening amount in step S36. Then, the operation proceeds to later-described step S39.

On the other hand, if the cruise control flag is "1" in step S34, which indicates the fact that the automatic cruise is being in operation, the operation proceeds to "YES" and to step S37 where reference is made to the pseudo accelerator opening amount obtained by the pseudo accelerator opening calculation unit 22 as shown in FIG. 7 and then, reference is further made to the shifting map for the pseudo accelerator opening amount produced by using the obtained pseudo accelerator opening amount, in step S38. Then, the operation proceeds to step S39.

It should be understood that the step S34 corresponds to the cruise control determining means, which determines whether or not the cruise control is being in operation due to the cruise control function exhibited by the engine control unit 6. Thus, when it is determined that the cruise control is not being in operation ("NO" in step S34), switching is conducted in a manner such that reference is made to the detected actual accelerator opening amount and to the shifting map for the actual accelerator opening amount, on the basis of the detected actual accelerator opening amount and the engine rotating number. While when it is determined that the cruise control is being in operation ("YES" in step S34), switching is conducted in a manner such that reference is made to the pseudo accelerator opening amount calculated from the fuel injection amount and the engine rotating number, and to the shifting map for the pseudo accelerator opening amount on the basis of the calculated pseudo accelerator opening amount and the engine rotating number.

Then, it is determined whether or not an actuation condition to initiate an automatic shifting-operation is established in accordance with either the above-mentioned actual accelerator opening amount and the shifting map for the actual accelerator opening amount, or the pseudo accelerator opening amount and the shifting map for the pseudo accelerator opening amount in step S39. If the actuation condition for the automatic shifting-operation has not yet been established, the operation proceeds to "NO" and returns to step S31 to repeat the operations of steps S31 through S38.

If the actuation condition for the automatic shifting-operation is established, the operation proceeds to "YES" and to step S40 to complete the controlling operation after execution of the predetermined shift control by the normal automatic shifting-operation control.

With the described controlling operation, even if reference cannot be made to the amount of the accelerator depression conducted by a vehicle driver during the automatic cruise of the vehicle by the cruise control function, the transmission 4 can be automatically controlled in the like manner as the normal driving state of the vehicle.

In the foregoing description, the actual accelerator opening amount and the shifting map for the actual accelerator opening amount, or the pseudo accelerator opening amount and the shifting map for the pseudo accelerator opening amount are employed as components for executing determination as to whether or not the actuation condition for initiating the automatic shifting-operation is established. However, it should be understood that the present invention is not limited to the described embodiments and any different component or components may be used if such component or components could be an indication of any amount that is proportional to the intake air amount of the engine 2. For example, it is possible to determine whether the actuation condition for initiating the automatic shifting-operation is established by employing an intake pressure of the air-intake system of an engine. That is, either reference may be made to an actual intake pressure detected for the engine 2 and to a shifting map for the actual intake pressure, or reference may be made to a pseudo intake pressure obtained by calculation and to a shifting map for the pseudo intake pressure.

It should be understood that many variations and modifications to the described embodiments will occur to a person skilled in the art without departing from the scope and spirit of the invention as claimed in the accompanying claims.

We claim:

1. An automatic shifting-operation control system comprising:
    an intake air amount detecting means configured to detect an intake air amount of an engine;
    an engine control means configured to control operation of the engine by a signal indicating detected intake air amount, and to include one or both of a vehicle speed limiting function for reducing a fuel injection amount to suppress a driving speed of a vehicle to a speed equal to or less than a predetermined limited value and a cruise control function for setting the driving speed of the vehicle to an optional constant speed capable of allowing automatic cruise of the vehicle; and a transmission control means configured to control a transmission in accordance with a driving state of the vehicle, wherein the automatic shifting-operation control system further comprises a means for determining whether or not the vehicle speed is being limited by the vehicle speed limiting function, and wherein the automatic shifting-operation control system controls the transmission such that when it is determined that the vehicle speed is being limited, reference made to a detected intake air amount is interrupted while interrupting reference to a shifting map on the basis of the detected intake air amount and an engine rotating number, and reference is instead made to a pseudo intake air amount calculated from a fuel injection amount controlled to suppress the driving speed of the vehicle to a speed equal to or less than a predetermined limited value and the engine rotating number and to a specified shifting map based on the calculated pseudo intake air amount and the engine rotating number.

2. The automatic shifting-operation control system according to claim 1, wherein said intake air amount detecting means detects an accelerator opening amount of the engine.

3. The automatic shifting-operation control system according to claim 1, wherein the intake air amount detecting means detects an intake pressure of an air-intake system of the engine.

4. An automatic shifting-operation control system comprising:

an intake air amount detecting means configured to detect an intake air amount of an engine;

an engine control means configured to control an operation of the engine by a signal indicating a detected intake air amount, and to include one or both of a vehicle speed limiting function for reducing a fuel injection amount to suppress a driving speed of a vehicle to a speed equal to or less than a predetermined limited value, and a cruise control function for setting the driving speed of the vehicle to an optional constant speed capable of allowing an automatic cruise of the vehicle; and a transmission control means configured to control a transmission in accordance with a driving state of the vehicle, wherein the automatic shifting-operation control system further comprises a means for determining whether or not the cruise control is being in operation due to the cruise control function, and wherein the automatic shifting-operation control system controls the transmission such that when it is determined that the cruise control is being in operation, reference to a detected intake air amount is interrupted while interrupting reference to a shifting map on the basis of the detected intake air amount and the engine rotating number, and reference is instead made to a pseudo intake air amount calculated from a fuel injection amount for maintaining the optional constant speed during the cruise control and the engine rotating number, and to a specified shifting map on the basis of the pseudo intake air amount and the engine rotating number.

5. The automatic shifting-operation control system according to claim 4, wherein said intake air amount detecting means detects an accelerator opening amount of the engine.

6. The automatic shifting-operation control system according to claim 4, wherein the intake air amount detecting means detects an intake pressure of an air-intake system of the engine.

7. An automatic shifting-operation control system comprising:

an intake air amount detecting means configured to detect an intake air amount of an engine;

an engine control means configured to control an operation of the engine by a signal indicating a detected intake air amount, and to include one or both of a vehicle speed limiting function for reducing a fuel injection amount to suppress a driving speed of a vehicle to a speed equal to or less than a predetermined limited value, and a cruise control function for setting the driving speed of the vehicle to an optional constant speed capable of allowing an automatic cruise of the vehicle; and a transmission control means configured to control a transmission in accordance with a driving state of the vehicle, wherein the automatic shifting-operation control system further comprises a means for determining whether or not the vehicle speed is being limited by the vehicle speed limiting function, wherein the automatic shifting-operation control system control the transmission such that when it is determined that the vehicle speed is being limited, reference to a detected intake air amount is interrupted while interrupting reference to a shifting map based on the detected intake air amount and the engine rotating number, and reference is instead made to a pseudo intake air amount calculated from a fuel injection amount controlled to suppress a driving speed of the vehicle to a speed equal to or less than a predetermined limited value and the engine rotating number, and to a specified shifting map on the basis of the pseudo intake air amount and the engine rotating number, wherein the automatic shifting-operation control system still further comprises a means for determining whether or not the cruise control is being in operation by the cruise control function, and wherein the automatic shifting-operation control system controls the transmission such that when it is determined that the cruise control is being in operation, reference to the detected intake air amount is interrupted while interrupting reference to a shifting map on the basis of the detected intake air amount and the engine rotating number, and reference is instead made to a pseudo intake air amount calculated from a fuel injection amount for maintaining the optional constant speed during the cruise control and the engine rotating number, and to a specified shifting map on the basis of the calculated pseudo intake air amount and the engine rotating number.

8. The automatic shifting-operation control system according to claim 7, wherein said intake air amount detecting means detects an accelerator opening amount of the engine.

9. The automatic shifting-operation control system according to claim 7, wherein the intake air amount detecting means detects an intake pressure of an air-intake system of the engine.

* * * * *